US007805303B2

(12) United States Patent
Sugihara et al.

(10) Patent No.: US 7,805,303 B2
(45) Date of Patent: Sep. 28, 2010

(54) QUESTION ANSWERING SYSTEM, DATA SEARCH METHOD, AND COMPUTER PROGRAM

(75) Inventors: Daigo Sugihara, Kanagawa (JP);
Hiroshi Masuichi, Kanagawa (JP);
Hiroki Yoshimura, Kanagawa (JP);
Tomoko Ohkuma, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 701 days.

(21) Appl. No.: 11/299,746

(22) Filed: Dec. 13, 2005

(65) Prior Publication Data
US 2006/0235689 A1 Oct. 19, 2006

(30) Foreign Application Priority Data
Apr. 13, 2005 (JP) ............................. 2005-115893

(51) Int. Cl.
*G10L 15/00* (2006.01)
*G06F 17/28* (2006.01)
(52) U.S. Cl. .......................................... 704/257; 704/5
(58) Field of Classification Search ................... None
See application file for complete search history.

(56) References Cited
U.S. PATENT DOCUMENTS
5,519,608 A * 5/1996 Kupiec ........................ 704/9

2009/0037398 A1 * 2/2009 Horvitz et al. ................ 707/4

FOREIGN PATENT DOCUMENTS
JP A-2004-118647 4/2004

OTHER PUBLICATIONS

Hideki Isozaki; "NTT's Question Answering System for NTCIR QAC2"; *Working Notes of NTCIR-4*; Tokyo, Japan; Jun. 2-4, 2004; pp. 326-332.
Kentaro Torisawa; "A Nearly Unsupervised Learning Method for Automatic Paraphrasing of Japanese Noun Phrases"; *Proceedings of the Workshop on Automatic Paraphrasing*; Tokyo, Japan; Dec. 2001; pp. 63-72.
Daisuke Kawahara et al.; "Case Frame Construction by Coupling the Predicate ad its Closet Case Component"; *Natural Language Processing*; vol. 9, No. 1; 2002; pp. 3-19. (w/ abst.).

(Continued)

*Primary Examiner*—Michael N Opsasnick
(74) *Attorney, Agent, or Firm*—Oliff & Berridge, PLC

(57) ABSTRACT

A question answering system includes a question input unit, a search unit, an answer candidate extraction unit, an answer candidate inspection unit and an answer output unit. The search unit executes search processing based on an input question. The answer candidate extraction unit extracts an initial answer candidate based on a result of the search processing. The answer candidate inspection unit inspects the initial answer candidate. The answer candidate inspection unit executes search processing with using a query including the initial answer candidate. The answer candidate inspection unit determines whether each word of a sentence obtained as a result of the search processing has a similar lexical meaning to that of each word of the input question. The answer candidate inspection unit selects an initial answer candidate contained in a query determined to have the similar lexical meaning, as a secondary answer candidate.

18 Claims, 8 Drawing Sheets

OTHER PUBLICATIONS

Tomoyosi Akiba et al.; Question Answering using Common Sense Knowledge latent in Corpora and Utility Maximization Principle; *Japan Information Processing Society Research Report, 2004-NL-163*; pp. 131-138. (w/ abst.).

Hiroshi Masuichi et al.; "Constructing a practical Japanese Parser based on Lexical Functional Grammar"; *Natural Language Processing*; vol. 10, No. 2; 2003; pp. 79-109. (w/ abst.).

Miriam Butt et al.; "The Parallel Grammar Project"; *Proceedings of COLING-2002 Workshop on Grammar Engineering and Evaluation*; 2002; pp. 1-7.

Hiroshi Masuichi et al.; "Japanese Parser on the basis of the Lexical-Functional Grammar Formalism and its Evaluation"; *Proceedings of the 17$^{th}$ Pacific Asia Conference on Language, Information and Computation (PACLIC17)*; 2003; pp. 298-309.

Ronald M. Kaplan et al.; "Lexical-Functional Grammar: A Formal System for Grammatical Representation"; *Formal Issues in Lexical-Functional Grammar*; 1995; pp. 1-102.

\* cited by examiner

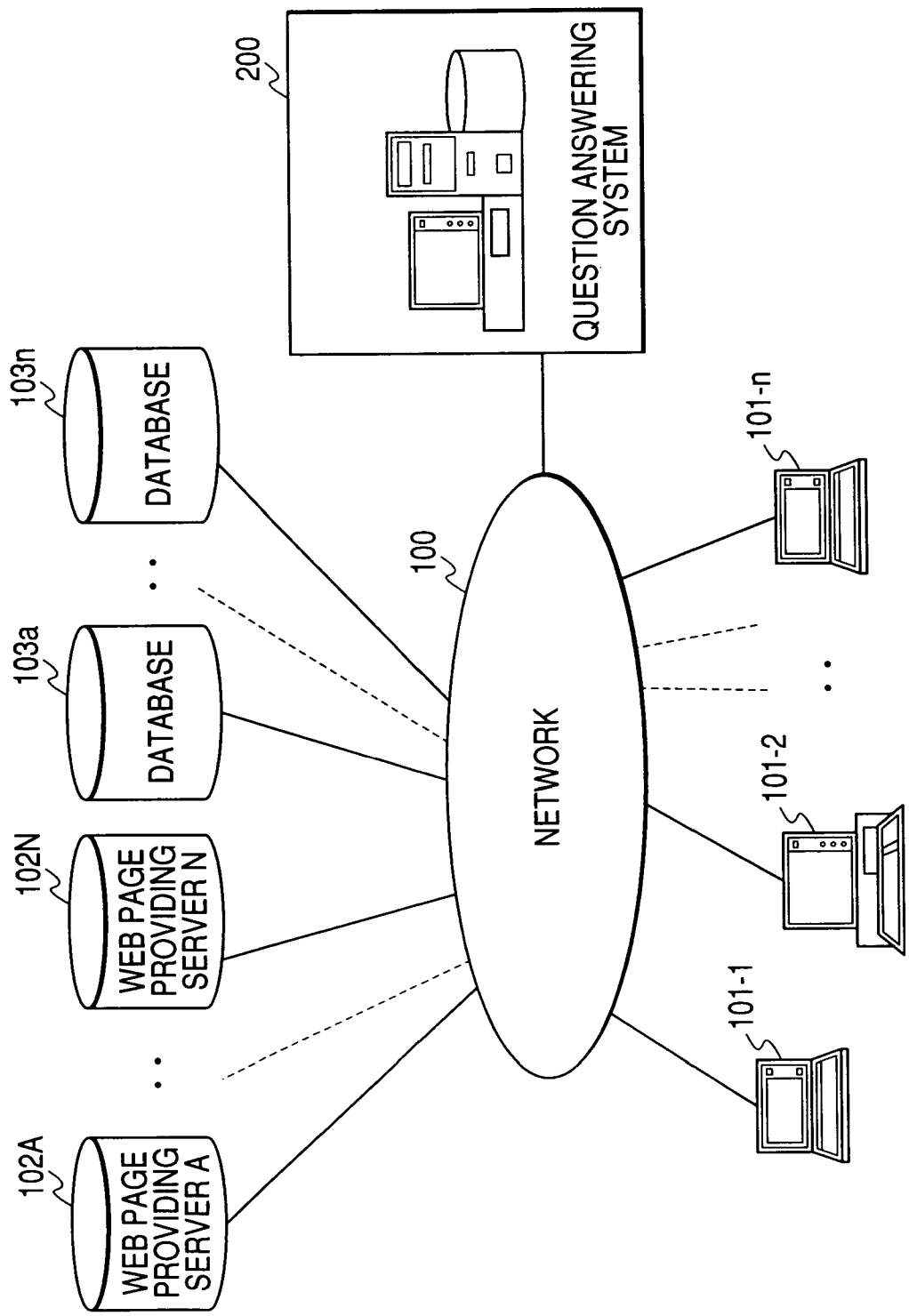

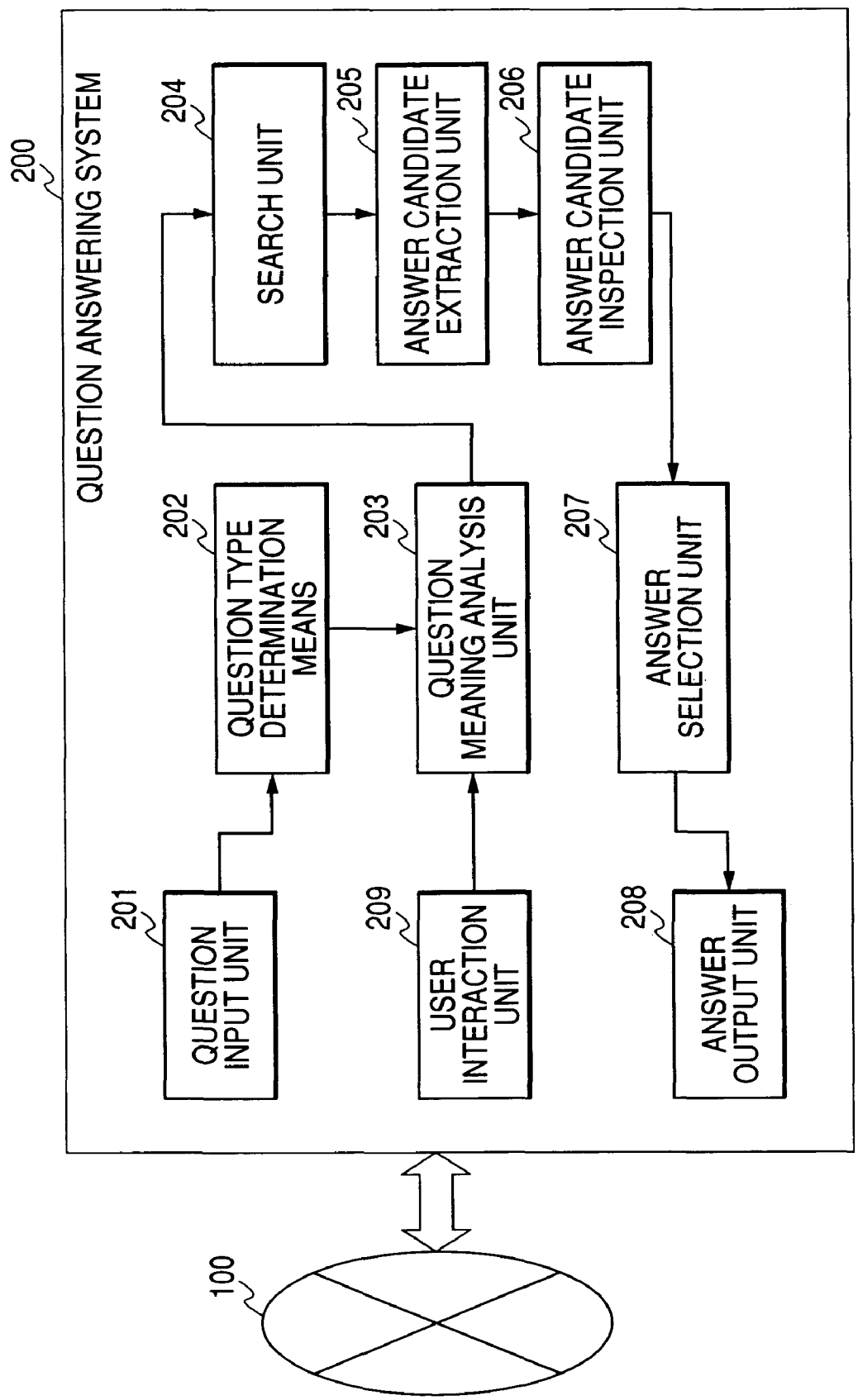

FIG. 3

A result of the morphological analysis of sentence A "(Yano) went to Hiroshima City"

| | |
|---|---|
| went | verb |
| to | preposition |
| Hiroshima | noun-proper noun-place name-general |
| City | noun-suffix-place name |
| | period |

A result of the morphological analysis of sentence B "(Kuroda) went to Hiroshima Carp"

| | |
|---|---|
| went | verb |
| to | preposition |
| Hiroshima | noun-proper noun-organization |
| Carp | noun-proper noun-general |
| | period |

When "Hiroshima" in "Who is a baseball player who went to Hiroshima in 2003?" is "place name" ⇨ select or add points to an answer candidate having context like the sentence A ⇨ "Yano"

"organization" ⇨ select or add points to an answer candidate having context like the sentence B ⇨ "Kuroda"

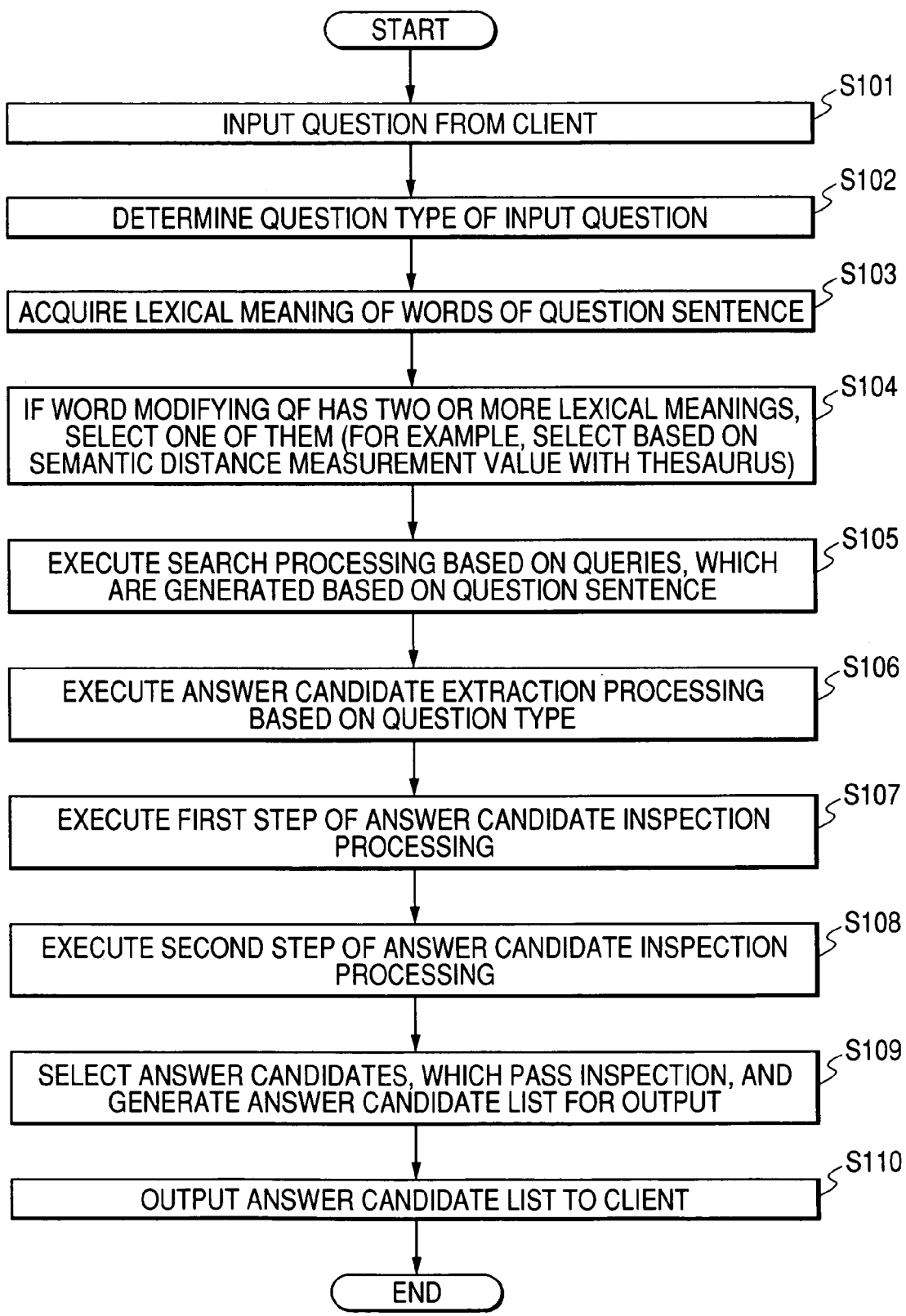

FIG. 7

| | | |
|---|---|---|
| Go (1) | SUBJ | person, player, student, ... |
| | OBL | organization, school, baseball team, ... |
| Go (2) | SUBJ | person, player, student, public official, ... |
| | OBL | place name, place, ... |

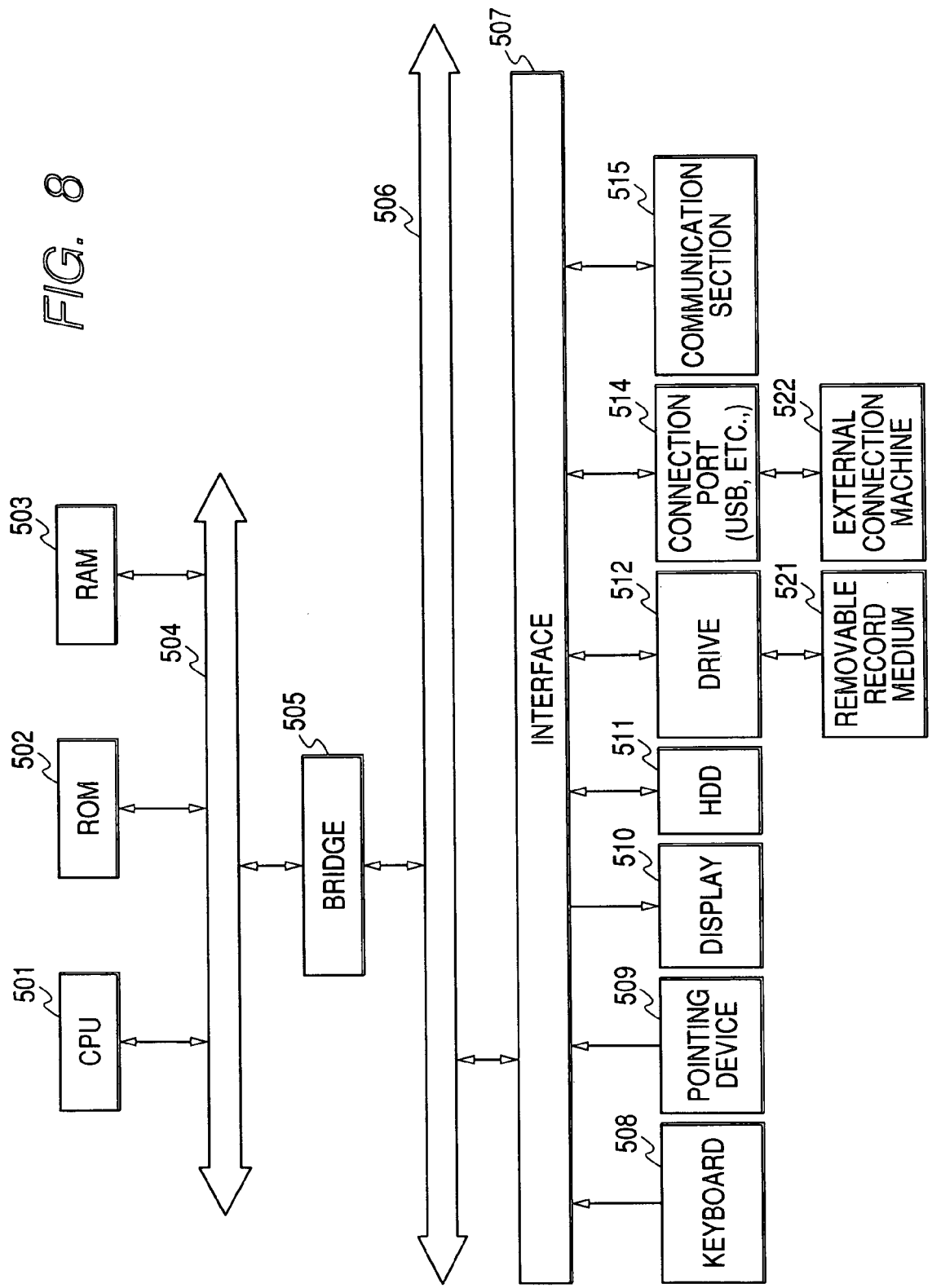

QUESTION ANSWERING SYSTEM, DATA SEARCH METHOD, AND COMPUTER PROGRAM

BACKGROUND OF THE INVENTION

1. Field of the Invention

This invention relates to a question answering system, a data search method, and a computer program, and more particularly to a question answering system, a data search method, and a computer program, which can provide amore precise answer to a question in a system wherein the user enters a question sentence and an answer to the question is provided.

2. Description of the Related Art

Recently, network communications through the Internet, etc., have grown in use and various services have been conducted through the network. One of the services through the network is search service. In the search service, for example, a search server receives a search request from a user terminal such as a personal computer or a mobile terminal connected to the network and executes a process responsive to the search request and transmits the processing result to the user terminal.

For example, to execute search process through the Internet, the user accesses a Web site providing search service and enters search conditions of a keyword, category, etc., in accordance with a menu presented by the Web site and transmits the search conditions to a server. The server executes a process in accordance with the search conditions and displays the processing result on the user terminal.

Data search process involves various modes. For example, a keyword-based search system wherein the user enters a keyword and list information of the documents containing the entered keyword is presented to the user, a question answering system wherein the user enters a question sentence and an answer to the question is provided, and the like are available. The question answering system is a system wherein the user need not select a keyword and can receive only the answer to the question; it is widely used.

Most of question answering systems executes extracts answer candidates to a question from a document set, which is not organized unlike various Web pages or a database that can be accessed, a so-called open domain document set, for example. An art of checking whether or not each answer candidate obtained by searching is an appropriate answer as an answer to the question from the client in such a question answering system for extracting answer candidates is researched.

For example, "Question Answering using Common Sense Knowledge latent in Corpora and Utility Maximization Principle" (Tomoyosi AKIBA, Atsushi FUJII and Katunobu ITOU, Japan Information Processing Society Research Report, 2004-NL-163, pp. 131-138) discloses an art of checking whether or not an answer candidate extracted by searching using a text set other than the search target text set applied to extraction of answer candidate is appropriate as an answer to the question. Specifically, this document discloses processing of checking whether or not the question focus from a client and an answer candidate obtained by searching have hypernym-hyponym relation in a thesaurus, for example, or if the question sentence is a question about a numeric value as an answer, processing of checking whether or not an answer candidate obtained by searching matches the question focus. This document further discloses a configuration for inspecting validity of an answer to the question using a determination pattern representing a relation between the question focus and the acquired answer candidate, and a corpus (search target Language data). JP 2004-118647 A also discloses a processing configuration for inspecting quantity representation, for example, checking that "meters" or "feet" is adequate for representing the elevation.

Here, it is noted that the notion of "question focus" was first introduced by Wendy Lehnert in her book "The Process of Question Answering." In this book, at page 6, section 1.1-7 the focus of a question is defined as the question concept that embodies the information expectations expressed by the question. For example, given that a question sentence "Who is the President of United States?". The "question type" of this question sentence is a question inquiring about a person. In other words, the question type means "who", "what", "when" and the like. The "question type" is also called as a "main topic" of a question. On the other hand, the "question focus" of this question sentence is a question about the President of United States. The "question focus" is also called as a "query subtopic," "topic of question" or "question subject."

Thus, several arts of determining the validity of an answer candidate, which is found using an open-domain information source (also called knowledge source), in the question answering system have been proposed. However, such an answer candidate inspection method basically requires the following procedure:

a: QF (question focus) is extracted from a question sentence using a handcrafted pattern. For example, "film director" is acquired as QF from a question sentence of "Who is a film director presented the People's Honor Award?"

b. Searching based on the QF is executed according to a technique similar to that of the existing question answering system, and answer candidates are acquired. For example, "Keizo Obuchi" and "Akira Kurosawa" are obtained. It is noted that Keizo Obuchi (Jun. 25, 1937-May 14, 2000) was a Japanese politician and the 84th Prime Minister of Japan from Jul. 30, 1998 to Apr. 5, 2000.

c. A pattern made up of the QF (question focus) and the answer candidates is generated and a corpus (search target language data) is searched with using the generated pattern as a search character string. For example, if the corpus is again searched with using a pattern made up of character strings of "a film director named Keizou Obuchi" and "a film director named Akira Kurosawa" and then found search result is obtained, it is determined that the answer candidate applied to the pattern has high validity for the question, and only such an answer candidate is output as the answer to the question.

However, in the answer inspection technique described above, a pattern made up of the QF (question focus) and the answer candidates is generated and a search is made; only the QF (question focus) is acquired from the question sentence input from the client, but the configuration does not acquire further information to be used in the inspection.

In such an inspection technique, there is a possibility that the following problem may occur: For example, the following question is considered:

Question

"Who is a baseball player who went to Hiroshima in 2003?"

A word acquired as the QF (question focus) for this question is "baseball player". For example, the following patterns are generated for answer candidates (A, B, . . . ) obtained as the search result:

[A is a baseball player]
[B is a baseball player]

Then, inspection is conducted by searching a corpus with using these generated patterns.

However, the inspection may not be sufficient in some cases. That is, if a user who inputs Question "Who is a baseball player who went to Hiroshima in 2003?" intends that "Hiroshima" contained in this question sentence means a baseball team of "Hiroshima Carp", answer candidates, which is obtained with using the search keywords of "2003, Hiroshima, baseball player", probably contain any "baseball player" other than "baseball players of Hiroshima Carp." The answer candidates obtained based on the keywords of "2003, Hiroshima, player" may contain baseball player names of other Japanese professional baseball teams such as opposing teams of Hiroshima Carp and a baseball team with which Hiroshima Carp trades baseball players. It is noted that Hiroshima Carp is one of professional baseball teams in Japan's Central League.

At this time, if only "baseball player" is extracted as the QF (question focus) from the question, and inspection is conducted with using a character string pattern made up of the QF (question focus) and an answer candidate, even an answer candidate of a baseball player of any other baseball team has a sufficient possibility that a hit sentence will appear in the corpus, and the answer candidate passes the inspection, resulting in an erroneous determination that the answer to the user question is valid.

For example, if a player named "YANO," who is a player of Hanshin Tigers (another one of the professional baseball teams in Japan's Central League), is obtained as an answer candidate, according to the technique described above, QF (question focus) for question ="baseball player"
answer candidate="YANO"

are used to generate a character string pattern of "YANO of a baseball player". If the corpus is searched with the character string pattern of "YANO of a baseball player" as a query, The probabilities that a hit sentence will be found in the corpus is sufficiently high. If a character string of "a baseball player who went to Hiroshima" is used as QF, there remains lexical semantic ambiguity as to whether "Hiroshima" in the QF has meaning of "place name" or "sports team" and valid inspection may not be conducted.

SUMMARY OF THE INVENTION

As described above, the answer candidate inspection technique in the question answering system for providing an answer to a user's question may present an erroneous answer to the questioner (client). The invention provides a question answering system, a data search method, and a computer program, which can select a more appropriate answer as an answer to a question by conducting higher-accuracy inspection effective even for a question sentence.

According to a first aspect of the invention, a question answering system includes a question input unit, a search unit, an answer candidate extraction unit, an answer candidate inspection unit and an answer output unit. The question input unit is input to a question. The search unit executes search processing on a basis of the input question. The answer candidate extraction unit extracts an initial answer candidate on a basis of a result of the search processing executed by the search unit. The answer candidate inspection unit inspects the initial answer candidate extracted by the answer candidate extraction unit. The answer output unit outputs a secondary answer candidate selected by the answer candidate inspection unit. The answer candidate inspection unit executes search processing with using a query including the initial answer candidate extracted by the answer candidate extraction unit.

The answer candidate inspection unit determines whether or not each word of a sentence, which is obtained as a result of the search processing executed by the answer candidate inspection unit, has a similar lexical meaning to a lexical meaning of each word of the input question. The answer candidate inspection unit selects an initial answer candidate contained in a query, which is determined to have the similar lexical meaning, as the secondary answer candidate.

According to a second aspect of the invention, a data search method includes: inputting a question; executing search processing on a basis of the input question; extracting an initial answer candidate on a basis of a result of the search processing; inspecting the initial answer candidate extracted to select a secondary answer candidate; and outputting the answer candidate finally selected. The inspecting of the initial answer candidate includes: executing search processing with using a query including the initial answer candidate extracted; determining whether or not each word of a sentence, which is obtained as a result of the search processing executed with using the query including the initial answer candidate, has a similar lexical meaning to a lexical meaning of each word of the input question; and selecting an initial answer candidate contained in a query, which is determined to have the similar lexical meaning, as the secondary answer candidate.

According to a third aspect of the invention, a computer program is stored in a recording medium. The computer program causes a computer to execute data search processing. The data search processing includes: inputting a question; executing search processing on a basis of the input question; extracting an initial answer candidate on a basis of a result of the search processing; inspecting the initial answer candidate extracted to select a secondary answer candidate; and outputting the answer candidate finally selected. The inspecting of the initial answer candidate includes executing search processing with using a query including the initial answer candidate extracted; determining whether or not each word of a sentence, which is obtained as a result of the search processing executed with using the query including the initial answer candidate, has a similar lexical meaning to a lexical meaning of each word of the input question; and selecting an initial answer candidate contained in a query, which is determined to have the similar lexical meaning, as the secondary answer candidate.

The computer program of the invention is a computer program that can be provided by a record medium or a communication medium for providing the computer program for a computer system that can execute various program codes in a computer-readable format, for example, a record medium such as a CD, an FD, or an MO or a communication medium such as a network. Such a program is provided in the computer-readable format, whereby processing responsive to the program is realized in a computer system.

The above and other objects, features and advantages of the invention will be apparent from the following detailed description of the preferred embodiment of the invention in conjunction with the accompanying drawings. The system in the specification is a logical set made up of a plurality of units (apparatus) and is not limited to a set of units (apparatus) housed in a single cabinet.

According to the configuration set forth above, in the system for providing an answer to a question, the lexical meaning of the input question is analyzed and the answer candidate inspection processing based on the lexical meaning of each word of the input question is executed. Thereby, it is made possible to select an optimum answer to the question as an answer candidate and provide the answer for the client.

Also, according to the configuration set forth above, it is made possible to select an optimum answer to the question as an answer candidate and provide the answer for the client.

BRIEF DESCRIPTION OF THE DRAWINGS

In the accompanying drawings:

FIG. 1 is a drawing of the network configuration to show an application example of a question answering system of the invention;

FIG. 2 is a block diagram to describe the configuration of the question answering system according to one embodiment of the invention;

FIG. 3 is a drawing to describe examples of the morphological analysis results of processing of answer candidate inspection unit in the question answering system according to the embodiment of the invention;

FIG. 4 is a flowchart to describe the processing sequence executed by the question answering system according to the embodiment of the invention;

FIG. 7 is a drawing to show a data example of a thesaurus applied in the question answering system according to the embodiment of the invention; and FIG. 8 is a block diagram to describe a hardware configuration example of the question answering system according to the embodiment of the invention.

DETAILED DESCRIPTION OF EMBODIMENTS OF THE INVENTION

Figure 5:
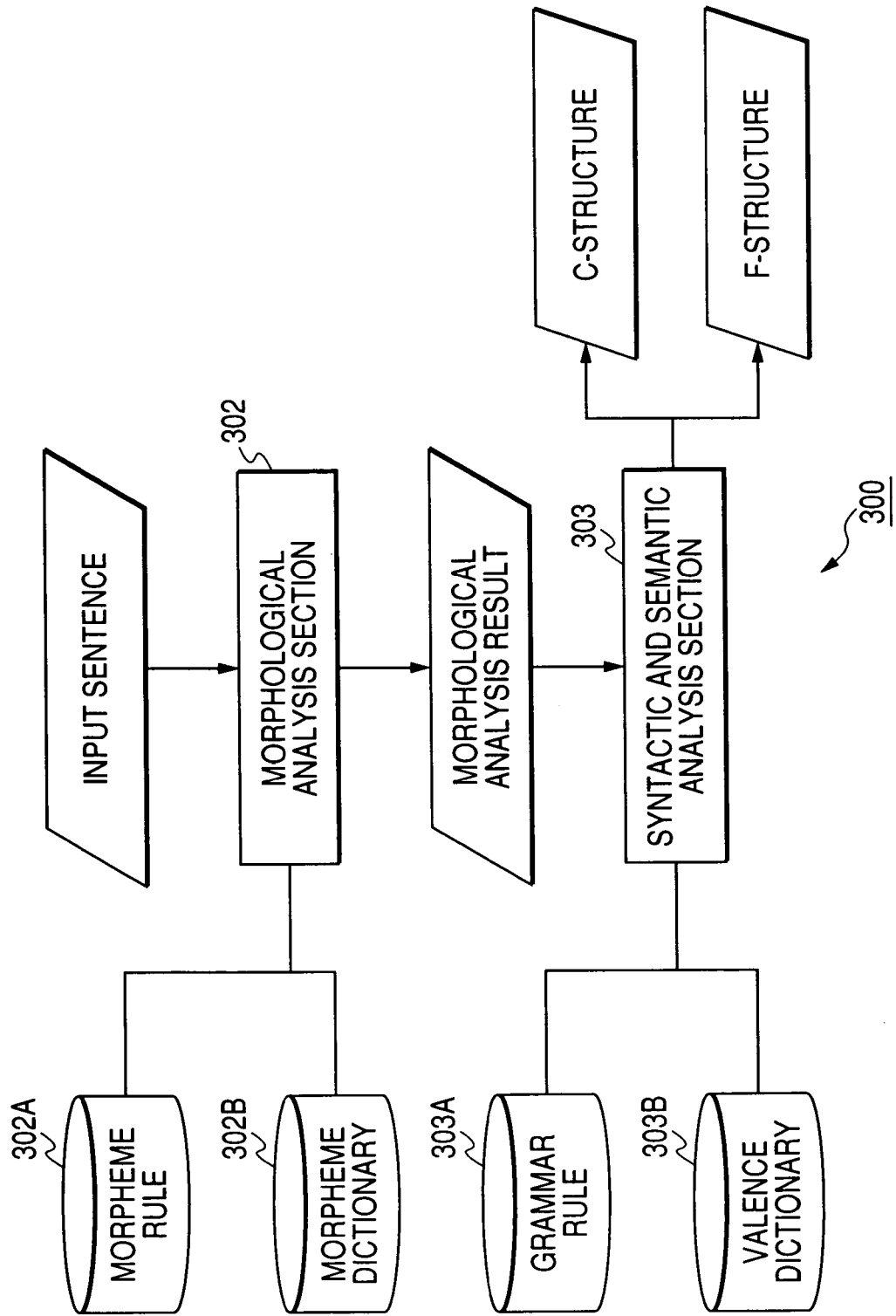
FIG. 5 is a diagram to describe a configuration example of a syntactic and semantic analysis system implementing inspection expression generation means in the question answering system according to the embodiment of the invention.

A question answering system, a data search method, and a computer program according to embodiments of the invention will be described in detail with reference to the accompanying drawings.

FIRST EXAMPLE

To begin with, a first example of the question answering system of the invention will be described with reference to FIG. 1. FIG. 1 is a drawing to show the network configuration wherein a question answering system 200 of the invention is connected to a network. A network 100 shown in FIG. 1 is a network of the Internet, an intranet, etc. Connected to the network 100 are clients 101-1 to 101-*n* as user terminals for transmitting a question to the question answering system 200 and various Web page providing servers 102A to 102N for providing Web pages as materials to acquire answers to the clients 101-1 to 101-*n* and databases 103*a* to 103*n*.

The question answering system 200 inputs various question sentences generated by the users from the clients 101-1 to 101-*n* and provides the answers to the input questions for the clients 101-1 to 101-*n*. The answers to the questions are acquired from the Web pages provided by the Web page providing servers 102A to 102N, document data stored in the databases 103*a* to 103*n*, and the like. The Web pages provided by the Web page providing servers 102A to 102N and the data stored in the databases 103*a* to 103*n* are the data to be searched and are called a corpus or information sources, knowledge sources, etc.

The Web page providing servers 102A to 102N provide Web pages as pages opened to the public by a WWW (World Wide Web) system. The Web page is a data set displayed on a Web browser and is made up of text data, HTML layout information, an image, audio, a moving image, etc., embedded in a document. A set of Web pages is a Web site, which is made up of a top page (home page) and other Web pages linked from the top page.

The configuration and processing of the question answering system 200 will be described with reference to FIG. 2. The question answering system 200 is connected to the network 100 and executes processing of receiving an answer from a client connected to the network 100, searching the Web pages provided by the Web page providing servers and other databases connected to the network 100 as the information sources for an answer, generating a list of answer candidates, for example, and providing the list for the client.

The question answering system of the first example inspects answer candidates obtained by making primary search for a question input from a client and determines validity of each answer candidate to the question. The question answering system of the first example acquires meanings of words making up a question sentence and uses the meanings in inspecting each answer candidate, to thereby inspect the answer candidates with higher accuracy.

Specifically, the meaning and relation of components of a question sentence are analyzed from the lexical and semantic combination in the question sentence and an answer candidate is selected based on the analysis result. For example, if Question "Who is a baseball player who went to Hiroshima in 2003?" is input, the question answering system of the first example obtains a relation among "baseball player," "Hiroshima," and "go" in a phrase "baseball player goes to Hiroshima" while distinguishing a relation of "go to the place of Hiroshima" and a relation of "join the baseball team named Hiroshima". It is determined which "place name" or "place name (or sports team)" "Hiroshima" in the question sentence is intended as. Then, the result of this determination is used to determine the meanings of words—which are included in the sentence including the answer candidate, included in the question sentence and obtained by initial searching in the question answering system—other than the answer candidate. That is, the meaning of "Hiroshima that a baseball player went to" in the case described above. Thereby the context suitable for the intention of the question sentence is determined and the answer candidates are discriminated from each other accordingly.

The advantages of using the lexical semantic relation among the words in the question sentence to conduct inspection are as follows: By using the lexical meaning, the question answering system can incorporates information other than the QF (question focus) of the question sentence into validity inspection processing of each answer candidate to the question absorb fluctuations of expression. Thereby, the question answering system can improve the relevance rate of inspection while limiting the answer candidates accurately. The question answering system can precisely determine the intention of the question sentence from the lexical and semantic combination in the question sentence and also can handle ambiguities in the meaning of the question separately. Thus, it is made possible to separately handle meanings forming the question sentence, such as installation of access to an external database for a specific case or answerback of the intention of the question sentence to the user.

The configuration of the question answering system 200 according to the first example of the invention will be described with reference to FIG. 2. As shown in FIG. 2, the question answering system 200 has a question input unit 201, a question type determination unit 202, a question meaning analysis unit 203, a search unit 204, an answer candidate extraction unit 205, an answer candidate inspection unit 206, an answer selection unit 207, an answer output unit 208, and an user interaction unit 209. The processing executed by each unit of the question answering system 200 will be described below.

[Question Input Unit]

The question input unit 201 is input to a question sentence (input question) from a client through the network 100. Assuming that the following question (Input Question)

"Who is a baseball player who went to Hiroshima in 2003?"

is input from the client as a specific question example, the processing executed by each unit of the question answering system 200 will be described.

[Question Type Determination Unit]

The question type determination unit 202 determines a question type of the input question sentence like most of the existing question answering systems. For example, from the following question sentence "Who is a baseball player who went to Hiroshima in 2003?", the question type determination unit 202 determines from the character string of "who" that a question type of this question sentence is "person."

[Question Meaning Analysis Unit]

The question meaning analysis unit 203 acquires the meanings of words making up the question sentence for the purpose of applying the acquired meanings to inspection processing of each answer candidate, which will be acquired by searching in the search unit 204, and using the acquired meanings in generating a search query, which will be applied to the searching in the search unit 204.

A specific example of the processing executed by the question meaning analysis unit 203 will be described. First, a known technique (for example, technique described in "Question Answering using Common Sense Knowledge latent in Corpora and Utility Maximization Principle" (Tomoyosi AKIBA, Atsushi FUJII and Katunobu ITOU, Japan Information Processing Society Research Report, 2004-NL-163, pp. 131-138)) is used to acquire QF (question focus) from the question sentence.

From (Input Question)

"Who is a baseball player who went to Hiroshima in 2003?", the question meaning analysis unit 203 selects "baseball player" as the QF (question focus).

Next, the question meaning analysis unit 203 acquires the acquired QF (baseball player) of the question sentence and a word modifying the QF to give them to the next processing. To acquire the word modifying the QF (baseball player) of the question sentence, for example, the question meaning analysis unit 203 executes syntactic and semantic analysis processing. For example, the question meaning analysis unit 203 analyzes the question sentence by executing morphological analysis, syntactic analysis, semantic analysis, context analysis, etc., to detect the word modifying the QF (baseball player) of the question sentence. As a result of the analysis, the question meaning analysis unit 203 detects the word "Hiroshima" modifying the QF with respect to the QF (baseball player) of the question sentence.

Next, with regard to lexis of the word "Hiroshima" qualifying the acquired QF (baseball player) of the question sentence, the question meaning analysis unit 203 acquires the lexical meaning of the word using an existing thesaurus. For example, the question meaning analysis unit 203 obtains two meanings (word meanings) of "place name" and "baseball team" from the word of "Hiroshima" based on the thesaurus.

If it is desired to give priority to the obtained word meanings, the question meaning analysis unit 203 may measure a thesaurus distance giving similarity between the two word meanings and give pseudo-priority to the two word meanings based on the measured distance. For example, the question meaning analysis unit 203 may determine which of the two word meanings of "Hiroshima" ("place name" and "baseball team") is closer to "baseball player" in terms of the thesaurus distance and give the priority to the two word meanings of "Hiroshima". Let the semantic attributes of the two words on the thesaurus be x and y, the depths of the hierarchy from the root of the thesaurus of the semantic attributes be lx and ly, and the depth of the hierarchy matching in the two semantic attributes be L. At this time, the distance (semantic distance) between the two word meanings x and y on the thesaurus generally is given as follows:

$$\text{dist}(x, y) = 2L/(lx+xy)$$

Letting the semantic attributes of the two meanings "place name" and "baseball team" of "Hiroshima" be x1 and x2 and the semantic attribute of "baseball player" be y, distance between "Hiroshima (place name)" and "baseball player": dist (x1, y)

distance between "Hiroshima (baseball team)" and "baseball player": dist (x2, y)

The question meaning analysis unit 203 calculates dist (x1, y) and dist (x2, y).

The question meaning analysis unit 203 compares the two distances dist (x1, y) and dist (x2, y) on the thesaurus, and gives high priority to the word meaning having the shorter distance. In the following description, it is assumed that the answer meaning analysis unit 203 gives high priority to "baseball team|(synonym) Carp" as the meaning of "Hiroshima".

Here, it is specially noted that in the first example, the ambiguity of "Hiroshima" contained in the question sentence is solved using the QF (question focus) contained in the question sentence. However, for example, if a special character string cannot be set as QF (question focus) as in "Who is a person who went to Hiroshima in 2003?", processing may be continued with the lexical combination only in the question sentence acquired without solving the ambiguity of the meaning of "Hiroshima" and the lexical semantic ranking is determined at a stage of inspecting the answer candidates.

Alternatively, as another configuration, if a word of the question sentence contains two or more meanings, the user may be notified that the word contains two or more meanings and the meaning may be determined after reception of user reply. This processing is executed by requesting the user to make a determination using the user interaction unit 209 shown in FIG. 2.

If the ambiguity of a word of the question sentence cannot be solved, when the answer candidate inspection unit 206 inspects the answer candidates at a later stage, the answer candidate inspection unit 206 may inspect each answer candidate while using restriction provided for each lexical meaning properly, and outputs the obtained inspection result for each. Thus, in the technique of conducting inspection using the meaning between the words in the question sentence, it is made possible to separately handle for accuracy improvement without decreasing the adequateness rate.

[Search Unit]

The search unit 204 searches a document from a search target based on a keyword obtained from the question sentence and extracts a sentence data (passage) where a possible answer candidate seems to exist, as with most of the existing question answering systems. The search target data is Web pages provided by the Web page providing servers 102A to 102N shown in FIG. 1, the document data stored in the databases 103*a* to 103*n* shown in FIG. 1, and the like, called a corpus or information sources, knowledge sources, etc.

A specific technology involved in the data search processing is shown, for example, in "NTT's Question Answering System for NTCIR QAC2" (Isozaki, H., Working Notes of NTCIR-4 Workshop, pp. 326-332 (2004))."

Specifically, the search unit obtains a document from the search target, using keywords such as "2003, Hiroshima, baseball player" acquired from
   question sentence
      "Who is a baseball player who went to Hiroshima in 2003?".

Then, the search unit 204 obtains from the document, sentence data (passage) where a possible answer candidate seems to be contained.

[Answer Candidate Extraction Unit]

The answer candidate extraction unit 205 selects a word corresponding to the question type "person" determined by the question type determination unit 202 described above, out of the passage, which the search unit 204 acquires by executing the search processing, and acquires the selected word as an answer candidate.

For example, the answer candidate extraction unit 205 obtains a noun, which appears in the vicinity of the keywords "2003, Hiroshima, baseball player" acquired from
   question sentence
      "Who is a baseball player who went to Hiroshima in 2003?"

and is given a "person" tag as an NE (named entity) tag indicating lexis, from the passage, and handles it as an answer candidate.

[Answer Candidate Inspection Unit]

The answer candidate inspection unit 206 inspects each answer candidate, which the answer candidate extraction unit 205 extracts from the passage with using the character string of QF (question focus) and the restriction on the lexical meaning obtained by the question meaning analysis unit 203. For example, if the answer candidates obtained by searching based on the keywords "2003, Hiroshima, baseball player" acquired from
   question sentence
      "Who is a baseball player who went to Hiroshima in 2003?"

contain answer candidates of "Kuroda," "Yano," and "Tsuneo Watanabe," the answer candidate inspection unit 206 inspects these answer candidates according to the following procedure.

Tsuneo Watanabe is the owner of Yomiuri Giants, which is one of professional baseball teams in Japan's Central League.

(First Step)

First, the answer candidate inspection unit 206 executes inspection with using the character string of QF (question focus) according to the existing technique.

That is, the answer candidate inspection unit 206 generates search queries including each of the character string pattern:

[QF (question focus)+answer candidate]

and searches the corpus (information source).

Specifically, for example, the answer candidate inspection unit 206 generates search queries such as
  a) "baseball player named Kuroda"
  b) "baseball player named Yano"
  c) "baseball player named Tsuneo Watanabe"

with respect to an external corpus of Web pages provided by the Web page providing servers, etc., and holds hit documents (found documents) corresponding to the search queries.

As a result of this processing, the hit documents corresponding to the two search queries of
  a) "baseball player named Kuroda"
  b) "baseball player named Yano"

are detected, but a hit document corresponding to the search query of
  c) "baseball player named Tsuneo Watanabe"

is not detected. Consequently, "Kuroda" and "Yano" of baseball players pass the inspection and are left as the answer candidates. However, "Tsuneo Watanabe" is not a baseball player, no hit document is detected, and "Tsuneo Watanabe" does not pass the inspection and is excluded from the answer candidates.

(Second Step)

Next, for each answer candidate, the answer candidate inspection unit 206 inspects as to whether or not each search keyword used in the context of the document from which each answer candidate is obtained in the searching in the first step is used as the lexical meaning of the question sentence obtained by the question meaning analysis unit 203.

In this inspection processing, for each answer candidate obtained by the answer candidate extraction unit 205, the answer candidate inspection unit 206 determines as to whether or not the search keyword used in the context of the document from which the answer candidate is obtained is used as the lexical meaning obtained by the question meaning analysis unit 203. Here, "2003, Hiroshima, baseball player" are applied as the search keywords and in the inspection of the first step, the hit documents corresponding to the two search queries of
  a) "baseball player named Kuroda"
  b) "baseball player named Yano"

are detected. Thus, the answer candidate inspection unit 206 determines as to whether or not "Hiroshima" in the hit documents is used as the lexical meaning obtained by the question meaning analysis unit 203.

"Hiroshima" is a part, which modifies QF (baseball player) obtained from the question sentence "Who is a baseball player who went to Hiroshima in 2003?". The question meaning analysis unit 203 determines the lexis of "Hiroshima" by measuring thesaurus distances of the two meanings. "place name" and "baseball team", which is obtained from the existing thesaurus. Specifically, the question meaning analysis unit 203 determines that "Hiroshima" contained the question sentence means "baseball team", based on:
   distance between "Hiroshima (place name)" and "baseball player": dist $(x1, y)$ distance between "Hiroshima (baseball team)" and "baseball player": dist (x2, y)

Therefore, the answer candidate inspection unit 206 determines as to whether or not "Hiroshima" contained in the documents, which are found in response to the two search queries of:
 a) "baseball player named Kuroda"
 b) "baseball player named Yano"
as the hit documents in the inspection of the first step, means a "baseball team".

In order to execute this determination processing, the answer candidate inspection unit 206 executes morphological analysis processing with respect to each of the hit documents containing "Yano" or "Kuroda." FIG. 3 shows a result of the morphological analysis with respect to sentences contained in the hit documents in the search processing of the first step described above, namely, in the searching based on the two search queries of
 a) "baseball player named Kuroda"
 b) "baseball player named Yano".

The morphological analysis is analysis processing of dividing a sentence into morphemes of minimal meaningful units and performing certification processing of part of speech.

FIG. 3 shows a result of the morphological analysis results of the two hit sentences of
 A. partial data of the result of the morphological analysis result on "(Yano) went to Hiroshima city."; and
 B. partial data of the result of the morphological analysis on "(Kuroda) went to Hiroshima Carp."

The result of the morphological analysis on "Hiroshima" in A. "Yano went to Hiroshima city." is "noun-proper noun-place name-general" and
the result of the morphological analysis on "Hiroshima" in B. "Kuroda went to Hiroshima Carp." is "noun-proper noun-organization." Differences between the two results of the morphological analysis are "place name" and "organization" (the "general" portion is insignificant on processing and therefore is removed).

As described above, "Hiroshima" in the question sentence is determined as "baseball team," namely, organization by executing lexical analysis on
 question sentence
  "Who is a baseball player who went to Hiroshima in 2003?"
in the question meaning analysis unit 203.

"Hiroshima" in B. "Kuroda went to Hiroshima Carp." is used as similar usage to the lexical meaning of [Hiroshima (organization)] contained in the question sentence analyzed by the question meaning analysis unit 203, but
"Hiroshima" in A. "Yano went to Hiroshima city." is used as usage different from the lexical meaning of [Hiroshima (organization)] contained in the question sentence analyzed by the question meaning analysis unit 203.

Therefore, the answer candidate inspection unit 206 selects the answer candidate [Kuroda] contained in B. "Kuroda went to Hiroshima Carp." from the documents selected in the search processing in the first step described above, namely,
 A. "Yano went to Hiroshima city.";
 B. "Kuroda went to Hiroshima Carp."

The answer candidate inspection unit 206 may add score to [Kuroda] contained in B. "Kuroda went to Hiroshima Carp."

According to the answerer candidate inspection processing, an answer candidate list with
 "Kuroda"
only selected or set to the highest score as the answer candidates to
 question sentence
  "Who is a baseball player who went to Hiroshima in 2003?"
can be generated.

In the score addition processing to each answer candidate, a correspondence relation between the distance between semantic attributes of thesaurus and the right answer associated with the semantic attribute is learned. The meaning of "Hiroshima" contained in the hit document including the answer candidate is determined according to the threshold learned according to a sufficient amount of learning data. The answer candidates suitable for the intention of the question are acquired. The word of "Carp" synonymous with "baseball team" of "Hiroshima" may be obtained depending on the thesaurus. In sports teams, etc., a method of holding a program for directly searching a player database using a search query of "Hiroshima Carp, baseball player" is also effective.

[Answer Selection Unit]

The answer selection unit 207 generates an answer candidate list as a ranking list of the answer candidates selected by the answer candidate inspection unit 206, for example, based on the score.

[Answer Output Unit]

The answer output unit 208 outputs the answer candidates (secondary answer candidates) finally determined by the answer selection unit 207 to the client.

According to the processing described above, an answer candidate list with
 "Kuroda"
only selected or set to the highest score can be presented to the client, for example, as an answer to a question Q, namely,
 question Q:
  "Who is a baseball player who went to Hiroshima in 2003?"

If a plurality of words concerning a word modifying QF (question focus) in a question sentence exist as a result of the analysis processing executed by the question meaning analysis unit 203 and ambiguity is not solved, the meaning having a close semantic distance to QF and having high co-appearance frequency with QF in the corpus may be output preferentially.

For example, when the co-appearance frequency of "Hiroshima" and "baseball player" is counted, if the frequency at which "Hiroshima" has NE of "organization" is higher than the frequency at which "Hiroshima" has NE of "place name," the answer candidate of the context containing "Hiroshima" used as the meaning of "organization" like "Kuroda of Hiroshima Carp" can be output preferentially.

Next, the processing sequence executed by the question answering system according to the first example of the invention will be described with reference to a flowchart of FIG. 4.

At step S101, when a question is input from a client, the question type of the input question sentence is determined at step S102. The question type determination unit 202 shown in FIG. 2 executes this processing.

Since the character string "Who" is contained, it is determined that the question type of the question:
 "Who is a baseball player who went to Hiroshima in 2003?"
is "person."

Next, at step S103, processing of acquiring the lexical meaning of component words of the question sentence is executed. The question meaning analysis unit 203 shown in FIG. 2 executes this processing. This processing acquires meanings of words making up the question sentence for the purpose of applying the acquired meanings to inspection processing of each answer candidate and using the acquired meanings in generating a search query applied to searching.

From

Question

"Who is a baseball player who went to Hiroshima in 2003?",

QF (baseball player) of the question sentence and "Hiroshima", which is a word modifying the QF are extracted, and the lexical meaning of the word "Hiroshima" modifying the QF is acquired using the thesaurus.

In this case, the two meanings (word meanings) of "place name" and "baseball team" are obtained from the word of Hiroshima, for example, based on the thesaurus. Next, at step S104, the lexical meaning of the analysis target word of the question sentence is determined based on the thesaurus distance (semantic distance). The processing at this step may be executed if the word modifying the QF has more than one lexical meaning.

That is, in the example described above, the two meanings (word meanings) of "place name" and "baseball team" are obtained from the thesaurus about "Hiroshima." Thus, the semantic distances between the QF (baseball player) contained in the question and each of the modifier "Hiroshima (place name)" and "Hiroshima (baseball team)" having the semantic attribute are measured. That is, distance between "Hiroshima (place name)" and "baseball player": dist (x1, y)

distance between "Hiroshima (baseball team)" and "baseball player": dist (x2, y)

are calculated, and one having a closer semantic distance is selected as the lexical meaning of the modifier "Hiroshima" of the QF (baseball player) in the question.

In this case, "Hiroshima" is determined having the lexical meaning of "baseball team."

Next, at step S105, search processing corresponding to the question is performed. This search processing is search processing of the corpus (information source) of Web pages, databases, etc. The search unit 204 shown in FIG. 2 executes this search processing. The search processing with queries generated based on the keywords selected out of the question sentence is executed.

Specifically, for example, a document is obtained from a search target with using queries including keywords such as "2003, Hiroshima, baseball player", which are obtained from question sentence "Who is a baseball player who went to Hiroshima in 2003?".

Sentence data (passage) where a possible answer candidate seems to be contained is obtained from the obtained document.

Next, at step S106, a word corresponding to the question type determined by the question type determination unit 202 described above, for example, "person" is selected out of the passage obtained by executing the search processing, and the selected word is acquired as an answer candidate. The answer candidate extraction unit 205 in FIG. 2 executes this processing.

For example, the words "Kuroda," "Yano," and "Tsuneo Watanabe" are extracted as the words corresponding to "person" from the passage obtained by searching based on the keywords "2003, Hiroshima, baseball player" acquired from question sentence "Who is a baseball player who went to Hiroshima in 2003?"

and are adopted as answer candidates.

Next, answer candidate inspection processing is executed at steps S107 and S108. This processing is executed by the answer candidate inspection unit 206 shown in FIG. 2.

First, at step S107, the first step of the answer candidate inspection processing is executed.

This processing generates search queries each including a character string pattern

[QF (question focus)+answer candidate]

and searches the corpus (information source).

Specifically, if the answer candidates obtained by searching based on the keywords "2003, Hiroshima, baseball player" obtained from question sentence "Who is a baseball player who went to Hiroshima in 2003?"

contain the answer candidates of "Kuroda," "Yano," and "Tsuneo Watanabe," search queries such as a) "baseball player named Kuroda"

b) "baseball player named Yano"

c) "baseball player named Tsuneo Watanabe"

are generated, a search is made based on the search queries, and only the answer candidate having a hit document is maintained as the answer candidate and the answer candidate having no hit document is excluded from the answer candidates.

a) "baseball player named Kuroda"

b) "baseball player named Yano"

each have a hit document and only "Kuroda" and "Yano" are left as the answer candidates.

Step S108 is the second step of the answer candidate inspection processing, which inspects each answer candidate as to whether or not a word used in the context of the document from which each answer candidate is obtained in the searching at the first step (S107) is used as the lexical meaning of the question sentence obtained by the question meaning analysis unit 203.

Morphological analysis is executed on the documents detected as the hit documents corresponding to the two search queries a) "baseball player named Kuroda"

b) "baseball player named Yano"

at the first step of the answer candidate inspection processing (step S107), namely, the documents A. "Yano went to Hiroshima city.";

B. "Kuroda went to Hiroshima Carp."

and inspection is executed for each answer candidate as to whether or not a word is used as the lexical meaning of the question sentence obtained by the question meaning analysis unit 203.

In this case, "Hiroshima" in the question sentence is interpreted as "baseball team," namely, organization by executing lexical analysis on question sentence "Who is a baseball player who went to Hiroshima in 2003?"

It turns out that "Hiroshima" in B. "Kuroda went to Hiroshima Carp." Is used as similar usage to the lexical meaning of [Hiroshima (organization)] in the question sentence analyzed by the question meaning analysis unit 203, but "Hiroshima" in A. "Yano went to Hiroshima city." is a place name and is used as usage different from the lexical meaning of [Hiroshima (organization)] in the question sentence.

Consequently, the answer candidate [Kuroda] contained in B. "Kuroda went to Hiroshima Carp." is selected or a score is added to the answer candidate [Kuroda].

At step S109, an answer candidate list as a ranking list of the answer candidates selected by executing the answer candidate inspection processing at steps S107 and S108, for example, based on the score is generated and is output to the client at step S110.

According to the processing set forth above, an answer candidate list with

"Kuroda"

only selected or set to the highest score can be presented to the client, for example, as the answer to question Q, namely, question Q:

"Who is a baseball player who went to Hiroshima in 2003?"

OTHER MODIFIED EXAMPLES

Next, other examples in the question answering system according to the invention will be described.

In the example described above, the question meaning analysis unit 203 executes processing of acquiring the QF (question focus) from the question sentence and further acquiring the modifier of the QF. The question meaning analysis unit 203 may use a case frame dictionary or a data structure corresponding to a case frame dictionary in inspecting a question sentence. If the case frame is used as a restriction, it is made possible to expand a query about a verb from a case element of the case frame. If case frame check is executed for a meaning pattern between words, whereby the inspection can be conducted with expanding absorption of fluctuations of description to a verb.

If a character string of QF cannot clearly be obtained as in "Who is a person going to Hiroshima?", a semantic class pattern of subjective case and oblique case can be obtained from the structure of the case frame and it becomes possible to inspect answer candidates.

An example of determining the meaning between words of a question sentence using a case frame and inspecting each answer candidate using the meaning determination in the question type determination unit 202 will be described below. In the following description, it is assumed that the question "Who is a baseball player who went to Hiroshima in 2003?" is input to the system.

To begin with, syntactic and semantic analysis processing of the question sentence is executed to obtain the structure of a case frame from the question sentence. First, the ending peculiar to a question sentence is removed. In this case, the ending of the question sentence is removed and the word "Who" peculiar to the question sentence is replaced with a dummy character string.

Who is a baseball player who went to Hiroshima in 2003?

A is a baseball player who went to Hiroshima in 2003.

Syntactic and semantic analysis processing is executed on the obtained sentence. The syntactic and semantic analysis processing will be described. Natural languages described in various languages including Japanese and English essentially have abstract and highly ambiguous nature, but can be subjected to computer processing as sentences are handled mathematically. Consequently, various applications and services concerning natural languages can be provided by automation processing, such as machine translation, an interactive system, a search system, and a question answering system. The natural language processing generally is divided into processing phases of morphological analysis, syntactic analysis, semantic analysis, and context analysis.

In the morphological analysis, a sentence is divided into morphemes of minimal meaningful units and certification processing of part of speech is performed. In the syntactic analysis, a sentence structure of a phrase structure, etc., is analyzed based on laws of grammar, etc. Since the grammar laws are of a tree structure, the syntactic analysis result generally becomes a tree structure where the morphemes are joined based on the modification relation, etc. In the semantic analysis, a semantic structure is composed to find a semantic structure representing the meaning of a sentence based on the meaning of the words in the sentence (notion), the semantic relation between the words, etc. In the context analysis, text of a series of sentences (discourse) is assumed to be the basic unit of analysis and the semantic (meaningful) unit between the sentences is obtained and a discourse structure is formed.

The syntactic analysis and the semantic analysis are absolutely necessary arts to realize applications of an interactive system, machine translation, document proofreading support, document abstract, etc., in the field of natural language processing.

In the syntactic analysis, a natural language sentence is received and processing of determining the modification relation between the words (segments) is performed based on the grammar laws. The syntactic analysis result can be represented in the form of a tree structure called dependency structure (dependency tree). In the semantic analysis, processing of determining the case relation in a sentence can be performed based on the modification relation between the words (segments). The expression "case relation" mentioned here refers to the grammar role such as subject (SUBJ) or object (OBJ) that each of the elements making up a sentence has. The semantic analysis may contain processing of determining the sentence tense, aspect, narration, etc.

As a syntactic and semantic analysis system example, a natural language processing system based on LFG is described in detail, for example, in "Constructing a practical Japanese Parser based on Lexical Functional Grammar" (Masuichi and Ohkuma, natural language processing, Vol. 10. No. 2, pp. 79-109 (2003)), "Japanese Parser on the basis of the Lexical-Functional Grammar Formalism and its Evaluation" (Hiroshi Masuichi, et al., In Proceedings of The 17th Pacific Asia Conference on Language, Information and Computation (PACLIC17), pp. 298-309 (2003)), "The Parallel Grammar Project" (Miriam Butt, Helge Dyvik, Tracy Holloway King, Hiroshi Masuichi, and Christian Rohrer, In Proceedings of COLING-2002 Workshop on Grammar Engineering and Evaluation, pp. 1-7, (2002)), "Lexical-Functional Grammar: A formal system for grammatical representation" (Ronald M. Kaplan and Joan Bresnan, In Joan Bresnan, editor, The Mental Representation of Grammatical Relations, The MIT Press, Cambridge, Mass., pages 173-281, (1982), Reprinted in Dalrymple, Kaplan, Maxwell, and Zaenen, editors, Formal Issues in Lexical-Functional Grammar, 29-130. Stanford: Center for the Study of Language and Information, (1995)), and US 2003/0158723 A, entire contents of which are incorporated herein by reference in its entirety. For example, the natural language processing system based on LFG can be used in the processing executed by the question meaning analysis unit 203, that is, in detecting the QF (baseball player) of the question sentence and detecting a part modifying the QF, "Hiroshima."

FIG. 5 shows the configuration of a syntactic and semantic analysis system 300 for executing natural language processing based on Lexical Functional Grammar (LFG). A morphological analysis section 302 has a morpheme rule 302A and a morpheme dictionary 302B concerning a specific language such as Japanese and/or English, and divides an input sentence into morphemes of minimal meaningful units and performs certification processing of part of speech. For example, if a sentence of "Watashi-no musume-ha eigo-wo hanashi-masu" (Japanese-language sentence, the English translation of this sentence is that "my daughter speaks English") is input, "Watashi {pronoun} no {up} musume {noun} wa {up} eigo {Noun} wo {up} hanashi {verb1} {tr} masu {jp}. {pt}" is output as the morphological analysis result.

Then, the result of the morphological analysis is input to a syntactic and semantic analysis section 303. The syntactic and semantic analysis section 303 has dictionaries such as a grammar rule 303A and a valence dictionary 303B and analyzes the phrase structure based on the grammar rule, etc., and analyzes the semantic structure representing the meaning of a sentence based on the meaning of the words in the sentence, the semantic relation between the words, etc., (the valence dictionary describes the relation with any other component in the sentence such as a verb and a subject, and the semantic relation between a predicate and its dependent word can be extracted). "c-structure (constituent structure)" representing the phrase structure of the sentence made up of words, morphemes, etc., as a tree structure is output as the syntactic analysis result, and "f-structure (functional structure)" is output as the result of semantically and functionally analyzing the input sentence as an interrogative sentence, past form, a polite sentence, etc., based on the case structure of a subject, an object, etc.

That is, c-structure represents the structure of a natural language sentence as a tree structure by collecting the morphemes of the sentence into an upper phrase, and f-structure represents semantic information of the case structure, sentence tense, aspect, narration, etc., of a sentence as an attribute-value matrix structure based on the notion of the grammar function.

In the example, the input question from the client is
(input question)
"Who is a baseball player who went to Hiroshima in 2003?".

Figure 6:
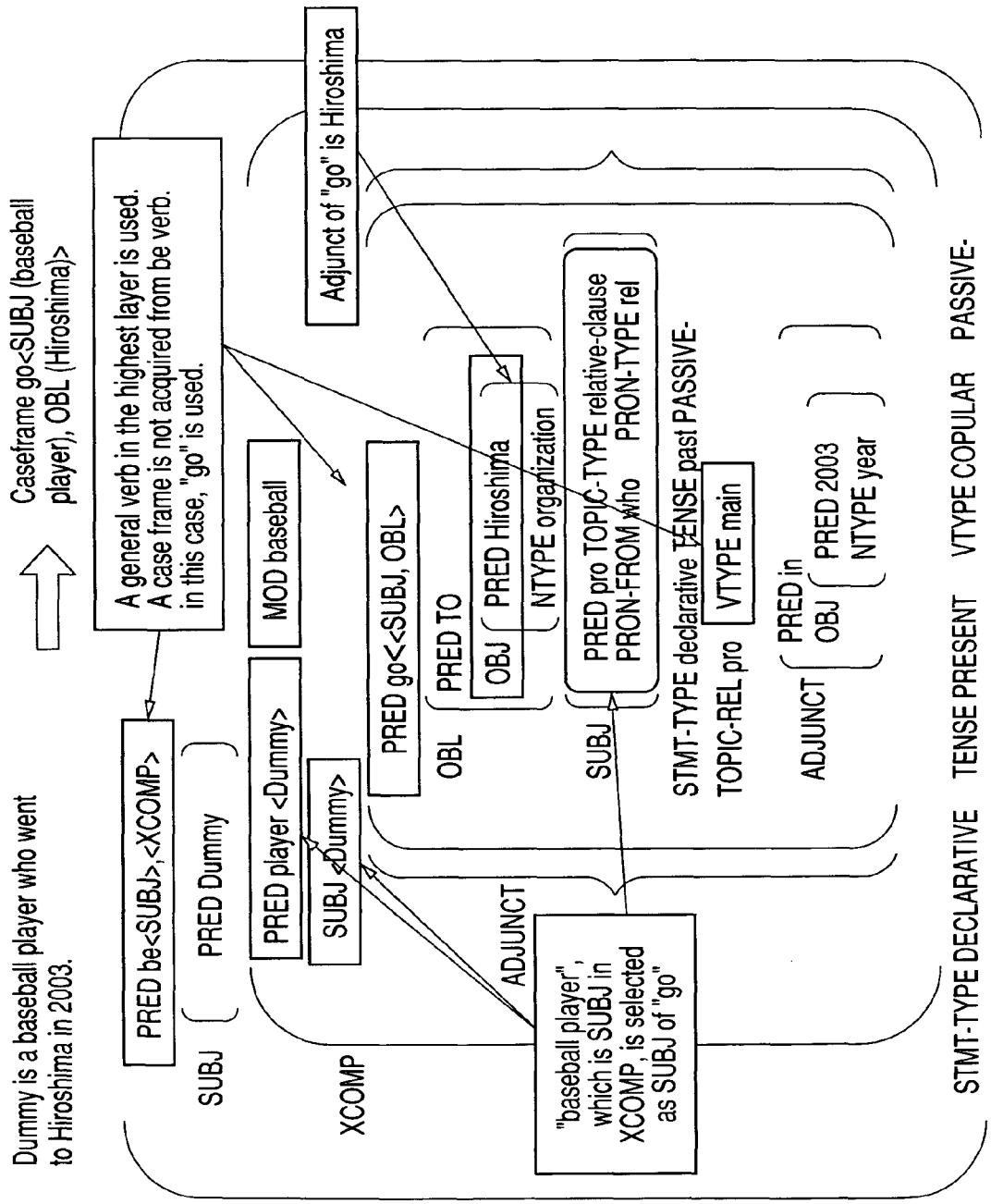
FIG. 6 is a drawing to show a data example of f-structure as the syntactic and semantic analysis result generated by performing syntactic and semantic analysis processing.

FIG. 6 shows f-structure as a result of the syntactic and semantic analysis of the sentence, which is assumed to be a sentence having an answer candidate to the question sentence
assumed sentence
"Dummy is a baseball player who went to Hiroshima in 2003".

F-structure represents the grammar function clearly and is made up of grammar function name, semantic format, and feature symbol. As f-structure is referenced, semantic understanding of subject, object, complement, adjunct, etc., can be obtained. f-structure is a set of features attendant on the nodes of c-structure shown as a tree structure, and is represented in the form of a matrix of attribute-value as shown in FIG. 6. That is, the left of the entries enclosed in [ ] is the name of the feature (attribute) and the right is the value of the feature (attribute value).

The f-structure shown in FIG. 6 is the analysis result of the answer assumed sentence to the question sentence. From the analysis result, it is possible to detect the QF (baseball player) of the question sentence and a part modifying the QF, "Hiroshima."

The syntactic and semantic structure of the question
"Who is a baseball player who went to Hiroshima in 2003?"
is summarized as follows:
Predicate: "be"
Subject: "Dummy"
XCOMP (a portion collectively including functions, which restrict the subject from outside) : "a baseball player who went to Hiroshima in 2003"

Next, the main verb of the sentence is determined and its case element is obtained. At this time, the following heuristics is used (See FIG. 6 for the syntactic and semantic structure). Since the interrogative of the input question was present at "Dummy", a matrix directly containing that portion is excluded from targets of the processing. A general verb in the highest layer on the syntactic and semantic structure is used as the main verb of a sentence. At this time, since be verb (corresponding to an auxiliary verb of "desu" in Japanese language), which is obtained as an analysis result of the input question, is not used, "go" is recognized as the main verb. In this case, "go" has two case elements SUBJ and OBL. However, if an XCOMP sentence or an adnominal clause exists, a modified noun is recognized as the case element of verb in the XCOMP sentence or the adnominal clause. In this case, "baseball player" is recognized as SUBJ.

In the example, the case frame is determined as follows: At this time, as the meaning of "Hiroshima," "organization" is obtained from the result of the syntactic and semantic analysis. However, the result does not consider the case frame.

(baseball player subject case) go (Hiroshima oblique case).

Next, the words of the question sentence and the semantic relation between the words are acquired based on the obtained case frame structure. In the processing, for example, a probability distribution corresponding to a case frame dictionary obtained using a known technique in "An Nearly Unsupervised Learning Method for Automatic Paraphrasing of Japanese Noun Phrases" (Kentaro Torisawa, In Proceedings of the Workshop on Automatic Paraphrasing, pp. 63-72, Tokyo, Japan, December, 2001) or a case frame dictionary based on "Case Frame Construction by Coupling the Predicate and its Closest Case Component" (Daisuke Kawahara and Sadao Kurohashi, Natural Language Processing, Vol. 9, No. 1, pp. 3-19, 2002) may be used For example, representing the following case frame according to a technique using a probability distribution corresponding to a case frame dictionary of Torisawa et al. is considered:

(baseball player subject case) went to (Hiroshima oblique case).

$$P(\text{basaball player}, SUBJ, \text{Hiroshima}, OBJ, \text{go}) = \sum_{a,b} (<SUBJ, OBJ, \text{go}> | a, b) \quad (1)$$

$$P(\text{baseball player} | a) P(\text{Hiroshima} | b) P(a, b)$$

In this expression, a and b are representation corresponding to the semantic class determined when the probability distribution is estimated from a corpus. The semantic classes to which "Hiroshima" easily belongs include a place name class containing words such as "Iwate, Oosaka, Koube, Yokohama," a sports team class containing words such as "Giants, Yokohama, Hanshin, Waseda," and the like. For example, the probability value of P (Hiroshima|place name class) or P (Hiroshima|sports team class) is higher than P (Hiroshima|person name class).

Using this nature, a semantic class pair {a, b} such that the probability value of P (baseball player, SUBJ, Hiroshima, OBL, go) becomes the maximum is selected, whereby the semantic structure of the case frame of "baseball player went to Hiroshima" can be grasped. Such semantic class setting is also possible in a similar manner using a fine thesaurus and a fine case frame dictionary. For example, assume that the thesaurus obtained by Kawahara et al. contains a slot concerning "go" shown in FIG. 7.

At this time, which "go" the words of "Hiroshima" and "baseball player" belong to can be determined using the case frame dictionary based on "Case Frame Construction by Coupling the Predicate and its Closest Case Component" (Daisuke Kawahara and Sadao Kurohashi, Natural Language Processing, Vol. 9, No. 1, pp. 3-19, 2002). The case frame structure can be used for search class expansion and answer candidate inspection as follows: In the following description, it is assumed that the a and b pair obtained here is the "player" class and the "sports team" class.

(Expansion of Search Query and Inspection Word Concerning Verb)

In the probability distribution represented by P (<SUBJ, OBL, V>|player class, sports team class), a verb giving a similar probability value to that of "go" is obtained and a search query can be expanded. For example, "join a team," etc., can be obtained. With a case frame dictionary of a general format, such query expansion about a verb can also be accomplished by comparing the distance between the case element verbs forming the case frame dictionary on the thesaurus. For example, the case frame dictionary is searched for a verb such that "baseball player or player" exists in SUBJ and that "Hiroshima (place name or organization)" exists in the frame of OBL, whereby a verb such as "join (a team)" about the verb of the question sentence can be acquired, and answer candidate inspection and document search can also be executed using it.

(Answer Candidate Inspection)

When verb, the case element of the oblique case, and the case element of the subjective case containing the answer candidate are acquired from the context from which the answer candidate is obtained and the semantic class of the subjective case and the case element of the oblique case are fixed to "player" and "sports team", respectively, if the probability value exceeds a threshold, it is assumed that the answer candidate passes the inspection. (However, if the words of the obtained answer candidate exist with less than a given frequency in the corpus, "person name class" and "organization class" need to be set as the higher-ranked classes.) For example, when "Kuroda" is obtained from a sentence of "Kuroda joined Hiroshima Carp," if the product of the probability values of P (SUBJ, OBL, join|name class, sports class) and P (Hiroshima Carp sports team class) and P (Kuroda|name) exceeds the threshold, it is assumed that the answer candidate passes the inspection. In the example, inspection based on the product of the probability values is conducted, but a general case frame dictionary and a thesaurus and further a rule determined by manpower between the semantic class and word may be used.

If a character string of QF cannot clearly be obtained as in "Who is a person who went to Hiroshima?", a candidate corresponding to QF can be obtained from the semantic class pattern of subjective case and oblique case from the case frame structure. That is, the subject of the question based on a clear character string like "baseball player" cannot be obtained, but the answer candidate under the following condition can be selected out of the case frame as the answer to the question.

Information indicating that "noun belonging to player class" is taken as the subject of "verb such as go or join (a team)" and "name taking sports team class" is taken in the oblique case is obtained and if QF cannot be acquired, inspection is made possible.

Thus, the case frame is used as the restriction, whereby it is made possible to expand a query about a verb from the case element of the case frame. Case frame check is performed for the meaning pattern between words, whereby absorption of fluctuations of description can be expanded to a verb for conducting inspection. If a character string of QF cannot clearly be obtained as in "Who is a person who went to Hiroshima?" a semantic class pattern of subjective case and oblique case can be obtained from the structure of the case frame and inspection of answer candidates is made possible.

Last, a hardware configuration example of an information processing apparatus implementing the question answering system for executing the processing described above will be described with reference to FIG. 8. A CPU (Central Processing Unit) 501 executes processing corresponding to an OS (Operating System) and executes the feature word extraction, the search processing, the query generation processing, the passage search processing, the morphological analysis processing, the answer candidate inspection processing, etc., based on the input question described above in the example. The CPU 501 executes the processing in accordance with a computer program stored in a data storage section of ROM, a hard disk, etc., of each information processing apparatus.

ROM (Read-Only Memory) 502 stores the program, operation parameters, etc., used by the CPU 501. RAM (Random Access Memory) 503 stores a program used in execution of the CPU 501, parameters, etc., changed whenever necessary in the execution of the CPU 501. They are connected by a host bus 504 implemented as a CPU bus, etc.

The host bus 504 is connected to an external bus 506 of a PCI (Peripheral Component Interconnect/Interface) bus, etc., via a bridge 505.

A keyboard 508 and a pointing device 509 are input devices operated by the user. A display 510 is implemented as a liquid crystal display, a CRT (cathode ray tube), or the like for displaying various pieces of information as text or an image.

An HDD (Hard Disk Drive) 511 contains a hard disk and drives the hard disk for recording or reproducing (playing back) a program executed by the CPU 501 and information. The hard disk is used as answer candidate and passage storage means as the search result, storage means of queries applied in the answer candidate inspection unit, storage means of hit sentences based on queries, storage means of the morphological analysis result on the hit sentences, answer candidate storage means, etc., for example, and further stores various computer programs such as a data processing program.

A drive 512 reads data or a program recorded on a removable record medium 521 such as a magnetic disk, an optical disk, a magneto-optical disk, or semiconductor memory mounted, and supplies the data or the program to the RAM 503 connected via the interface 507, the external bus 506, the bridge 505, and the host bus 504.

A connection port 514 is a port for connecting an external connection machine 522 and has a connection section of USB, IEEE 1394, etc. The connection port 514 is connected to the CPU 501, etc., via the interface 507, the external bus 506, the bridge 505, the host bus 504, etc. A communication section 515 is connected to a network for executing communications with a client and a network connection server.

The hardware configuration example of the information processing apparatus applied as the question answering system shown in FIG. 8 is an example of an apparatus incorporating a PC and the question answering system of the invention is not limited to the configuration shown in FIG. 8 and may have any configuration if the configuration has the capability of executing the processing described above in the examples.

While the invention has been described in detail in its preferred embodiment (examples), it is to be understood that modifications will be apparent to those skilled in the art without departing from the spirit and the scope of the invention. That is, the invention is disclosed for illustrative purposes only and it is to be understood that the invention is not limited to the specific embodiment (examples) thereof except as defined in the claims.

The processing sequence described in the specification can be executed by both or either of hardware and software. To execute software processing, the program recording the processing sequence can be installed in memory in a computer incorporated in dedicated hardware for execution or can be installed in a general-purpose computer that can execute various types of processing for execution.

For example, the program can be previously recorded on a hard disk or in ROM (Read-Only Memory) as a record medium or can be stored (recorded) temporarily or permanently on a removable record medium such as a flexible disk, a CD-ROM (Compact Disk Read-Only Memory), an MO (Magneto Optical) disk, a DVD (Digital Versatile Disk), a magnetic disk, or semiconductor memory. Such a removable record medium can be provided as a package software product.

The program not only can be installed in a computer from a removable record medium as described above, but also can be transferred by radio waves from a download site to a computer or can be transferred to a computer in a wired manner through a network such as the Internet for the computer to receive the program thus transferred and install the program on a record medium such as a hard disk incorporated.

The various types of processing described in the specification may be executed not only in time sequence according to the description, but also in parallel or individually in response to the processing capability of the apparatus for executing the processing or as required. The system in the specification is a logical set made up of a plurality of units (apparatus) and is not limited to a set of units (apparatus) housed in a single cabinet.

According to the configuration of the examples set forth above, in the system for providing an answer to a question, the lexical meaning of the input question is analyzed and the answer candidate inspection processing based on the lexical meaning of each word of the input question is executed. Thereby, it is made possible to select an optimum answer to the question as an answer candidate and provide the answer for the client.

Also, according to the configuration of the examples set forth above, it is made possible to select an optimum answer to the question as an answer candidate and provide the answer for the client.

FIG. 1
100 NETWORK
102A WEB PAGE PROVIDING SERVER A
102N WEB PAGE PROVIDING SERVER N
103a DATABASE
103n DATABASE
200 QUESTION ANSWERING SYSTEM

FIG. 2
200 QUESTION ANSWERING SYSTEM
201 QUESTION INPUT UNIT
202 QUESTION TYPE DETERMINATION MEANS
203 QUESTION MEANING ANALYSIS UNIT
204 SEARCH UNIT
205 ANSWER CANDIDATE EXTRACTION UNIT
206 ANSWER CANDIDATE INSPECTION UNIT
207 ANSWER SELECTION UNIT
208 ANSWER OUTPUT UNIT
209 USER INTERACTION UNIT

FIG. 4
START
S101 INPUT QUESTION FROM CLIENT
S102 DETERMINE QUESTION TYPE OF INPUT QUESTION
S103 ACQUIRE LEXICAL MEANING OF WORDS OF QUESTION SENTENCE
S104 IF WORD MODIFYING QF HAS TWO OR MORE LEXICAL MEANINGS, SELECT ONE OF THEM (FOR EXAMPLE, SELECT BASED ON SEMANTIC DISTANCE MEASUREMENT VALUE WITH THESAURUS)
S105 EXECUTE SEARCH PROCESSING BASED ON QUERIES, WHICH ARE GENERATED BASED ON QUESTION SENTENCE
S106 EXECUTE ANSWER CANDIDATE EXTRACTION PROCESSING BASED ON QUESTION TYPE
S107 EXECUTE FIRST STEP OF ANSWER CANDIDATE INSPECTION PROCESSING
S108 EXECUTE SECOND STEP OF ANSWER CANDIDATE INSPECTION PROCESSING
S109 SELECT ANSWER CANDIDATES, WHICH PASS INSPECTION, AND GENERATE ANSWER CANDIDATE LIST FOR OUTPUT
S110 OUTPUT ANSWER CANDIDATE LIST TO CLIENT

FIG. 5
302 MORPHOLOGICAL ANALYSIS SECTION
302A MORPHEME RULE
302B MORPHEME DICTIONARY
303 SYNTACTIC AND SEMANTIC ANALYSIS SECTION
303A GRAMMAR RULE
303B VALENCE DICTIONARY
A. INPUT SENTENCE
B. MORPHOLOGICAL ANALYSIS RESULT

FIG. 8
505 BRIDGE
507 INTERFACE
508 KEYBOARD
509 POINTING DEVICE
510 DISPLAY
512 DRIVE
514 CONNECTION PORT (USB, ETC.,)
515 COMMUNICATION SECTION
521 REMOVABLE RECORD MEDIUM
522 EXTERNAL CONNECTION MACHINE

What is claimed is:

1. A question answering system comprising:
a question input unit that receives an input question;
a search unit that executes a first search processing on a basis of the input question;
an answer candidate extraction unit that extracts an initial answer candidate on a basis of a result of the first search processing executed by the search unit;

an answer candidate inspection unit that inspects the initial answer candidate extracted by the answer candidate extraction unit; and an answer output unit that outputs the initial answer candidate selected by the answer candidate inspection unit, as an answer of the input question, wherein:

the answer candidate inspection unit generates one or more queries and executes a second search processing using the queries, each of the generated queries being a character string pattern relative to the input question and being generated based on one or more keywords included in the input question and one of the initial answer candidates extracted by the answer candidate extraction unit, the answer candidate inspection unit determines whether or not a composed word of a sentence, which is obtained as a result of the second search processing executed by the answer candidate inspection unit, has a similar lexical meaning to a lexical meaning of a specific word of the input question, and the answer candidate inspection unit selects the initial answer candidate included in the query, which is used when searching the sentence including the composed word that has the similar lexical meaning, as the answer.

2. The question answering system according to claim 1, wherein the answer candidate inspection unit executes the second search processing using the query in order to search for a sentence having the same word as the specific word of the input question, and the answer candidate inspection unit determines whether or not the composed word of the sentence, which has the same word as the specific word of the input question, has the similar lexical meaning to the lexical meaning of the specific word of the input question.

3. The question answering system according to claim 1, further comprising:

a question meaning analysis unit that extracts a question focus from the input question, wherein:

the answer candidate inspection unit generates the query including the question focus extracted by the question meaning analysis unit and the initial answer candidate extracted by the answer candidate extraction unit.

4. The question answering system according to claim 1, further comprising:

a question meaning analysis unit extracts a question focus and a modifier modifying the question focus from the input question, and analyzes a lexical meaning of the modifier as the lexical meaning of the specific word of the input question.

5. The question answering system according to claim 4, wherein the answer candidate inspection unit compares the lexical meaning of the modifier, which is analyzed by the question meaning analysis unit, with the composed word of the sentence obtained as the result of the second search processing.

6. The question answering system according to claim 4, wherein:

the question meaning analysis unit analyzes a semantic distance between the question focus and the modifier in a thesaurus in the analyzing of the lexical meaning of the modifier when existing a plurality of lexical meanings of a single modifier, and the question meaning analysis unit preferentially selects at least one of the plurality of lexical meanings of the analyzed modifier as the lexical meaning of that modifier, the one of the plurality of lexical meanings having the semantic distance closer to that question focus in the meaning distance.

7. The question answering system according to claim 4, wherein:

the question meaning analysis unit executes syntactic and semantic analysis processing of the input question to extract the question focus and the modifier from the input question.

8. The question answering system according to claim 7, wherein the question meaning analysis unit extracts the question focus and a phrase portion containing a verb directly modifying the question focus from the input question using a case frame dictionary in the syntactic and semantic analysis processing of the input question.

9. A data search method comprising:

inputting an input question;

executing a first search processing on a basis of the input question;

extracting an initial answer candidate on a basis of a result of the first search processing;

inspecting the extracted initial answer candidate; and outputting the extracted initial answer candidate selected by the inspecting of the initial answer candidate as an answer of the input question, wherein:

the inspecting of the initial answer candidate comprises:

generating one or more queries and executing a second search processing using the queries, each of the generated queries being a character string pattern relative to the input question and being generated based on one or more keywords including in the input question and one of the extracted initial answer candidates;

determining whether or not a composed word of a sentence, which is obtained as a result of the second search processing executed by using the query including the initial answer candidate, has a similar lexical meaning to a lexical meaning of a specific word of the input question; and selecting the initial answer candidate included in the query, which is used when searching the sentence including the composed word that has the similar lexical meaning, as the answer.

10. The data search method according to claim 9, wherein the inspecting of the initial answer candidate further comprises:

executing the second search processing using the query in order to search for a sentence having the same word as a specific word of the input question; and determining whether or not the composed word of the sentence, which has the same word as the specific word of the input question, has the similar lexical meaning to the lexical meaning of the specific word of the input question.

11. The data search method according to claim 9, further comprising:

extracting a question focus from the input question, wherein:

the inspecting of the initial answer candidate comprises:

generating the query including the extracted question focus and the extracted initial answer candidate.

12. The data search method according to claim 9, further comprising:

extracting a question focus and a modifier modifying the question focus from the input question; and analyzing a lexical meaning of the modifier as the lexical meaning of the specific word of the input question.

13. The data search method according to claim 12, wherein the inspecting of the initial answer candidate further comprising comparing the lexical meaning of the modifier, which is analyzed, with the composed word of the sentence obtained as the result of the second search processing.

14. The data search method according to claim 12, wherein the analyzing of the lexical meaning of the modifier comprises:
- analyzing a semantic distance between the question focus and the modifier in a thesaurus when existing a plurality of lexical meanings of a single modifier; and
- preferentially selecting at least one of the plurality of lexical meanings of the analyzed modifier as the lexical meaning of that modifier, the one of the plurality of lexical meanings having the semantic distance closer to that question focus in the meaning distance.

15. The data search method according to claim 12 wherein the analyzing of the lexical meaning of the modifier executes syntactic and semantic analysis processing of the input question to extract the question focus and the modifier from the input question.

16. The data search method according to claim 15, wherein the analyzing of the lexical meaning of the modifier further extracts the question focus and a phrase portion containing a verb directly modifying the question focus from the input question using a case frame dictionary in the syntactic and semantic analysis processing of the input question.

17. A computer program stored in a recording medium, the computer program causing a computer to execute data search processing comprising:
- inputting an input question;
- executing a first search processing on a basis of the input question;
- extracting an initial answer candidate on a basis of a result of the first search processing;
- inspecting the extracted initial answer candidate; and
- outputting the extracted initial answer candidate selected by the inspecting of the initial answer candidate as an answer of the input question, wherein:
- the inspecting of the initial answer candidate comprises:
  - generating one or more queries and executing a second search processing using the queries, each of the generated queries being a character string pattern relative to the input question and being generated based on one or more keywords including in the input question and one of the extracted initial answer candidates;
  - determining whether or not a composed word of a sentence, which is obtained as a result of the second search processing executed by using the query including the initial answer candidate, has a similar lexical meaning to a lexical meaning of a specific word of the input question; and
  - selecting the initial answer candidate included in the query, which is used when searching the sentence including the composed word that has the similar lexical meaning, as the answer.

18. The computer program stored in a recording medium according to claim 17, wherein
the inspecting of the initial answer candidate further comprises:
- executing the second search processing using the query in order to search for a sentence having the same word as a specific word of the input question; and
- determining whether or not the composed word of the sentence, which has the same word as the specific word of the input question, has the similar lexical meaning to the lexical meaning of the specific word of the input question.

* * * * *